(12) United States Patent
Wild et al.

(10) Patent No.: US 10,401,977 B2
(45) Date of Patent: Sep. 3, 2019

(54) USER INTERFACE

(71) Applicants: Jennifer Alison Wild, London (GB); Andrew Michael Wild, London (GB); Claire Catharine Wild, London (GB); Harriet Victoria Wild, London (GB); Teresa Kathleen Wild, London (GB)

(72) Inventors: Jennifer Alison Wild, London (GB); Andrew Michael Wild, London (GB); Claire Catharine Wild, London (GB); Harriet Victoria Wild, London (GB); Teresa Kathleen Wild, London (GB)

(*) Notice: Subject to any disclaimer, the term of this patent is extended or adjusted under 35 U.S.C. 154(b) by 0 days.

(21) Appl. No.: 15/106,230

(22) PCT Filed: Dec. 5, 2014

(86) PCT No.: PCT/GB2014/053623
§ 371 (c)(1),
(2) Date: Jun. 17, 2016

(87) PCT Pub. No.: WO2015/092361
PCT Pub. Date: Jun. 25, 2015

(65) Prior Publication Data
US 2017/0249020 A1 Aug. 31, 2017

(30) Foreign Application Priority Data
Dec. 19, 2013 (GB) .................................. 1322623.8

(51) Int. Cl.
*G06F 3/0338* (2013.01)
*G05G 9/04* (2006.01)
(Continued)

(52) U.S. Cl.
CPC ............. *G06F 3/0338* (2013.01); *G05G 5/03* (2013.01); *G05G 9/04* (2013.01); *G06F 3/016* (2013.01); *G06F 3/03547* (2013.01)

(58) Field of Classification Search
CPC .......... G06F 3/0338; G06F 3/016; G05G 9/04
See application file for complete search history.

(56) References Cited

U.S. PATENT DOCUMENTS

| 6,337,678 B1 | 1/2002 | Fish |
| 6,747,631 B1 * | 6/2004 | Sakamaki ................. G01L 1/14 345/157 |

(Continued)

FOREIGN PATENT DOCUMENTS

| CN | 103097990 A | 5/2013 |
| WO | WO-0191100 A1 | 11/2001 |
| WO | WO-2011008292 A1 | 1/2011 |

OTHER PUBLICATIONS

Japanese Office Action with English translation for Application No. 2016-560048 dated Jun. 13, 2017.
(Continued)

*Primary Examiner* — Towfiq Elahi
(74) *Attorney, Agent, or Firm* — Honigman LLP

(57) ABSTRACT

A user interface for an interactive device, the user interface comprising: an interactive surface formed by an array of displaceable surface members, the surface members having a resting position; an oscillatory signal generator configured to generate a oscillatory signal, the oscillatory signal generator being coupled to the surface members by a cable array which is configured to carry the oscillatory signal to the surface members, the surface members having a resting position with respect to the cable array; wherein the cable array is arranged such that movement of the surface members from the resting position adjusts the oscillatory signal producing a modified oscillatory signal and/or such that a modified oscillatory signal causes the surface members to move from the resting position; the user interface further
(Continued)

comprising a signal converter which converts the modified oscillatory signal to and/or from an electrical signal of the interactive device.

34 Claims, 9 Drawing Sheets

(51) Int. Cl.
    *G06F 3/01*         (2006.01)
    *G06F 3/0354*     (2013.01)
    *G05G 5/03*        (2008.04)

(56) References Cited

U.S. PATENT DOCUMENTS

| | | | |
|---|---|---|---|
| 2007/0097078 A1* | 5/2007 | Chin | G06F 3/0317 |
| | | | 345/166 |
| 2008/0169911 A1 | 7/2008 | Klinghult et al. | |
| 2013/0151960 A1* | 6/2013 | Wiertlewski | G06F 3/015 |
| | | | 715/702 |

OTHER PUBLICATIONS

International Search Report for Application PCT/GB2014/053623 dated Apr. 7, 2015.
U.K. Search Report for Application GB1322623.8 dated Jun. 10, 2014.
Canadian Office Action for Application No. 2,934,438 dated Apr. 28, 2017.
Office Action for Chinese Application No. 2014800759091 dated Jun. 5, 2018 with English translation.

\* cited by examiner

USER INTERFACE

TECHNICAL FIELD

The present invention relates to a user interface having an interactive surface, and particularly, but not exclusively, to such a user interface which can be used as an input and/or output device for a computer or games console.

BACKGROUND

Various user interfaces are known which allow physical human interaction with computer systems, such as personal computers, games consoles and mobile phones. Such user interfaces allow data to be input by the user to the computer system and/or output by the computer system to the user.

For example, touch screens are now commonplace in mobile phones. A touch screen can be used to output data as per a conventional visual display, but also acts as an input device based on the touch of a user either directly or via an additional implement, such as a stylus.

It is also known for touch screens to provide haptic feedback to the user. For example, many mobile phones vibrate when the user touches the screen to provide such haptic feedback and to acknowledge the touch of the user.

WO 01/91100 describes haptic feedback interface devices using electroactive polymer (EAP) actuators to provide haptic sensations and/or sensing capabilities. A haptic feedback interface device is in communication with a host computer and includes a sensor device that detects the manipulation of the interface device by the user and an electroactive polymer actuator responsive to input signals and operative to output a force to the user caused by motion of the actuator. The output force provides a haptic sensation to the user.

Further, WO 2012/063165 describes a user interface which comprises a touchable interaction surface formed by an array of actuators. The actuators are activated (i.e. moved out of the plane of the surface) in a coordinated manner such that they provide a haptic feedback to the user.

However, it is desired to provide a user interface which responds directly to an applied stimulus so as to provide improved feedback to the user and which allows wholesale changes to the surface.

SUMMARY

According to an aspect of the invention there is provided a user interface for an interactive device, the user interface comprising: an interactive surface formed by an array of displaceable surface members, the surface members having a resting position; an oscillatory signal generator configured to generate a oscillatory signal, the oscillatory signal generator being coupled to the surface members by a cable array which is configured to carry the oscillatory signal to the surface members, the surface members having a resting position with respect to the cable array; wherein the cable array is arranged such that movement of the surface members from the resting position adjusts the oscillatory signal producing a modified oscillatory signal and/or such that a modified oscillatory signal causes the surface members to move from the resting position; the user interface further comprising a signal converter which converts the modified oscillatory signal to and/or from an electrical signal of the interactive device.

The surface members may be mounted to a movable support member, the support member coupling the surface members to the cable array.

The surface members may be mounted to the support member via a pair of intermediate mounting members The intermediate mounting members may be disposed on either side of a pivot point of the support member The support member may form a base layer, the intermediate mounting members may form an intermediate layer and the surface members may form a surface layer, wherein each element of an underlying layer supports twice as many elements of an overlying layer as are in the underlying layer.

The support member, the intermediate mounting members and/or the surface members may be configured so as to have at least two degrees of freedom and are biased towards the resting position.

The surface members may be secured to the support member and/or intermediate mounting members using resilient cable binding, biasing the surface members towards the resting position The surface members may be detachably mounted to the support member or the intermediate member, and/or the intermediate member may be detachably mounted to the support member.

The surface members may be formed by posts which project from a proximal end nearest the cable array to a distal end, the distal ends of the surface members being adjacent to one another and defining the interactive surface.

The posts may be formed by an outer sleeve and an inner element which is received within the outer sleeve to form a telescoping arrangement.

The outer sleeve and inner element may be biased towards an extended position

The outer sleeve and inner element may be threadingly engaged with one another such that rotation of the outer sleeve relative to the inner element causes the outer sleeve to translate axially relative to the inner element.

The surface members may be formed by chevron-shaped wings which each define a quadrant of an opening, the interactive surface comprising a plurality of openings.

The user interface may further comprise a movable ball which is configured to traverse across the interactive surface in response to movement of the user interface, the ball having a plurality of projections which are received by the openings and which cause the surface members to move from the resting position so as to produce the modified oscillatory signal.

The interactive surface may be formed by a plurality of beltways which are disposed in different planes to enclose the ball, each of the beltways having a plurality of openings.

The projections may be arranged such that, at any one time, only one opening of each beltway receives a projection of the ball.

The ball may be coupled to a movement controller via a plurality of cables, wherein, in response to movement of the user interface, the movement controller moves relative to the user interface and in turn causes the ball to traverse across the interactive surface.

The interactive surface may be formed by a plurality of independent but functionally coupled modules, each module comprising a plurality of surface members.

The interactive surface may be configured to be adapted by replacing modules and/or introducing additional or removing modules to change the size of the interactive surface.

The modules may be coupled to one another by complementary abutting features, interconnections or via an interconnecting cable network.

Each module may be supported by a central shaft. The central shaft may be connected to the module at one end and a jack at an opposite end, the jack being configured to raise and lower the module relative to adjacent modules.

The jack may be formed by first and second plates which are connected by a plurality of jacking members, the jacking members being spaced around the circumference of the first and second plates. The jack has a raised configuration in which each of the jacking members is arranged axially such that their ends are aligned with one another in an axial direction, and a lowered configuration in which each of the jack members is angled with respect to the axial direction such that their ends are offset from one another in the axial direction. The jack is movable between the raised and lowered configurations by rotating the first and second plates relative to one another.

The jack may be configured to lower the surface members of the module to below the level of adjacent modules, wherein replacement surface members are held beneath the interactive surface, and wherein a replacing device is provided beneath the interactive surface to replace the surface members of the module with the replacement surface members.

The surface members and replacement surface members may have different physical properties.

The jack may be configured to raise the module above the level of adjacent modules to allow the module to be replaced with another module before being lowered to its original position.

The modules may be arranged in a grid formed by a plurality of columns of modules, with the cable array coupling the modules in each column to one another.

The cable array may further couple adjacent pairs of columns to one another.

The user interface may further comprise an interpreting unit coupled to the cable array at the end of each column, wherein the interpreting unit is configured to receive and interpret the modified oscillatory signal to derive information regarding the movement of the individual modules and/or to generate a modified oscillatory signal which causes the individual modules to move from their resting positions.

The user interface may further comprise an integrating unit which is in communication with a plurality of interpreting units, the integrating unit being configured to combine signals from the interpreting units into a single signal and/or decompose a signal into parts for each interpreting unit.

The signal converter may comprise an analogue to digital and/or digital to analogue converter which is configured to convert an analogue signal from the integrating unit into a digital signal to be used by the interactive device and/or to convert a digital signal from the interactive device into an analogue signal to be used by the integrating unit.

The analogue to digital converter may comprise an optical sensor having an emitter and a receiver, and an interrupter disposed between the emitter and the receiver; wherein the interpreter is configured to oscillate across a path between the emitter and receiver in response to an analogue signal such that the receiver observes a digital signal.

For a better understanding of the present disclosure, and to show more clearly how it may be carried into effect, reference will now be made, by way of example, to the accompanying drawings, in which:—

DETAILED DESCRIPTION

Figure 1:
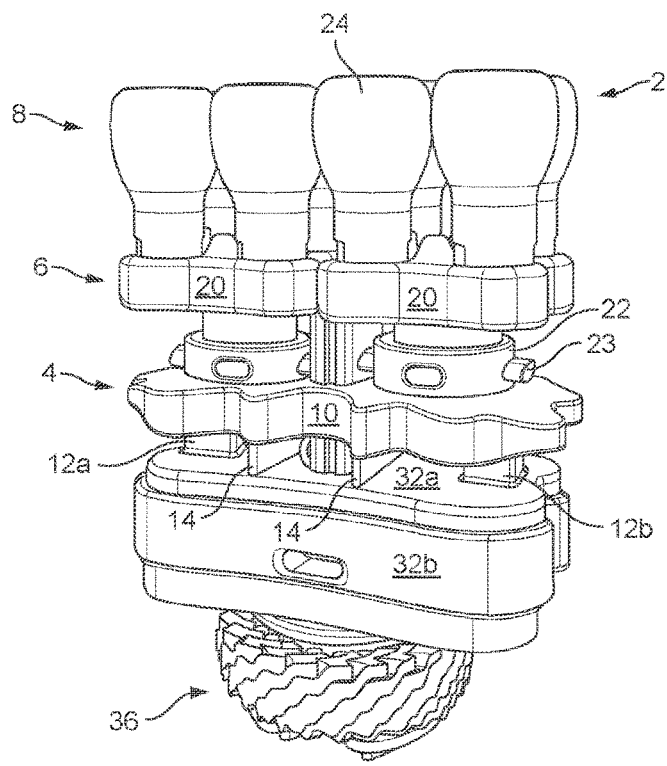
FIG. 1 is a perspective view of a module of a user interface according to an embodiment of the invention.

With reference to FIG. 1, a module 2 of a user interface according to an embodiment of the invention is shown. The user interface may be used to provide an input or output source for an interactive device, such as a mechanical or electronic device.

The module 2 is formed by a plurality of layers which overlie one another. In the embodiment depicted, the module 2 generally comprises a base layer 4, an intermediate layer 6 and a surface layer 8. The surface layer 8 is mounted onto the intermediate layer 6 which is in turn mounted on the base layer 4.

The base layer 4 is formed by a single support member 10. The support member 10 is a substantially rectangular plate formed by a pair of laterally extending wings.

The support member 10 has a substantially planar upper surface adjacent the overlying intermediate layer 6. A lower surface of the support member 10 comprises a first post 12a which projects perpendicularly from the lower surface at a position which is towards a lateral edge of the support member 10, and a second post 12b which similarly projects perpendicularly from the lower surface at a position which is towards the other lateral edge of the support member 10.

Disposed between the first and second posts 12a, 12b are a pair of ribs 14 which extend between leading and trailing edges of the support member 10. The ribs 14 are positioned either side of the centre of the support member 10.

The support member 10 tapers towards its lateral edges in two orthogonal planes, such that at the lateral edges the upper and lower surfaces are brought closer together, and the leading and trailing edges are brought closer together.

Figure 2:
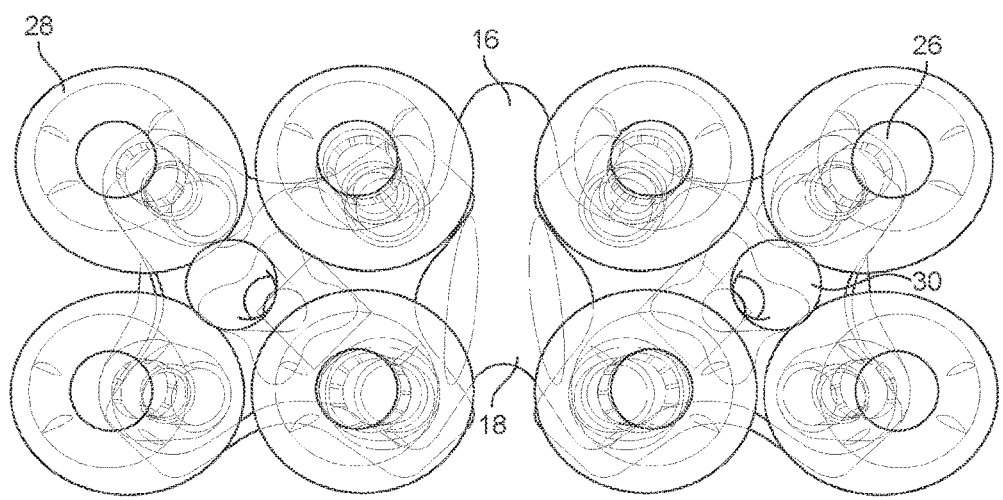
FIG. 2 is a top view of the module.

The leading and trailing edges of the support member 10 are provided with complementary features. As shown in FIG. 2, the leading edge is provided with a protrusion 16 which projects forward from the support member 10. Conversely, the trailing edge is provided with a recess 18 which projects into support member 10. The protrusion 16 and recess 18 are shaped so as to be able to mate with one another. Accordingly, as will be described in greater detail below, adjacent modules 2 can be interconnected by arranging the modules such that the protrusion 16 of one module 2 is received within the recess 18 of an adjacent module 2.

The intermediate layer 6 is formed by a pair of intermediate mounting members 20. The intermediate mounting members 20 are mounted on the underlying support member 10 of the base layer 4 such that the intermediate mounting members 20 are disposed either side of the centre of the support member 10 towards each lateral edge. As shown in FIG. 1, the intermediate mounting members 20 may each be coupled to the support member 10 by a mounting bracket 22. The mounting bracket 22 is connected to the support member 10 and receives a portion of the overlying intermediate mounting member 20. The mounting bracket 22 has a push-release mechanism formed by a pair of buttons 23 which when depressed allow the intermediate mounting members 20 to be detached from the support member 10. This allows the intermediate mounting members 20 to be replaced, as will be described below. Further, the mounting bracket 22 is rotatable relative to the intermediate mounting member 20 and the support member 10.

As best shown in FIG. 2, the intermediate mounting members 20 have a cruciform shape produced by four lobes. The intermediate mounting members 20 are arranged on the support member 10 such that axes between opposing lobes are angled at 45 degrees to a transverse axis of the support member 10.

The mounting of the intermediate mounting members 20 to the support member 10 is configured so as to provide the intermediate mounting members 20 with two degrees of freedom. In other words, each of the intermediate mounting members 20 is able to pivot about a point by pitching forwards and backwards and by rolling laterally towards either side of the support member 10, and combinations thereof.

The surface layer 8 is formed by a plurality of surface members 24 which are mounted on the underlying intermediate mounting members 20 of the intermediate layer 6. A surface member 24 is mounted on each of the lobes of the intermediate mounting members 20 such that each intermediate mounting member 20 carries four surface members 24, with the surface layer 8 having a total of eight surface members 24 in all.

The surface members 24 are elongate posts which are coupled at a proximal end to one of the intermediate mounting members 20 and extend perpendicularly away from the surface of the intermediate mounting member 20 to a free, distal end.

Each of the surface members 24 is mounted to one of the intermediate mounting members 20 in a manner which provides the surface members with two degrees of freedom. In other words, each of the surface members 24 is able to pivot about a point by pitching forwards and backwards and by rolling laterally towards either side of the support member 10, and combinations thereof.

Each surface member 24 may be formed by an inner post 26 and an outer sleeve 28. The inner post 26 and outer sleeve 28 are arranged concentrically, with the inner post 26 being disposed within the outer sleeve 28. The inner post 26 and outer sleeve 28 are telescopingly arranged such that the outer sleeve 28 is able to translate relative to the inner post 26. Accordingly, the height of the free end of the surface member 24 above its respective intermediate mounting member 20 can be varied. The inner post 26 and the outer sleeve 28 may be threadably engaged with one another such that translation of the outer sleeve 28 relative to the inner post 26 is achieved via rotation of the outer sleeve 28 relative to the inner post 26.

The free ends of the surface members 24 represent the uppermost surface of the module 2 (barring any protective covering provided thereon). The free ends of the surface members 24 define an interactive surface of the user interface which directly receives an input to the user interface and/or transmits an output from the user interface.

As shown in FIG. 2, a central post 30 may be disposed at the centre of each intermediate mounting member 20 and between the surface members 24 disposed thereon. The central post 30 is fixed on the intermediate mounting member 20 and provides a depth stop which avoids the surface members 24 from being over-depressed.

As will be apparent from the preceding description of the layers of the module 2, each element of an underlying layer (i.e. the support member 10 of the base layer 4 or the intermediate mounting members 20 of intermediate layer 6) supports twice as many elements of an overlying layer (i.e. the intermediate mounting members 20 of intermediate layer 6 or the surface members 24 of the surface layer 8) as are in the underlying layer. For example, the single support member 10 supports two intermediate mounting members 20. Similarly, the two intermediate mounting members 20 each support four surface members 24.

Figure 3:
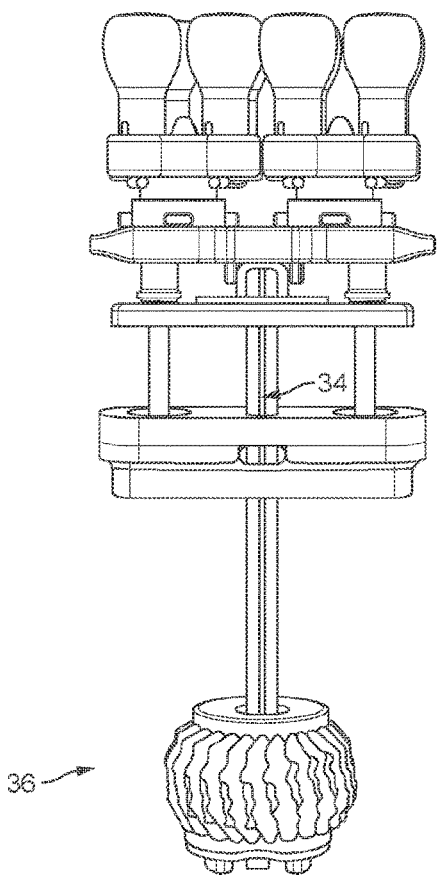
FIG. 3 is a side view of the module with a jack element in an extended position.

Referring again to FIG. 1 and now also to FIG. 3, the layers described previously are mounted on a base formed by separable upper and lower base members 32a, 32b. The first and second posts 12a, 12b of the support member 10 are received by openings in the upper base member 32a, with the ribs 14 lying adjacent an upper surface of the upper base member 32a. The coupling of the support member 10 to the upper base member 32a allows the support member 10 to translate laterally and to pitch and translate forwards and backwards, as described previously.

The upper base member 32a is connected to an end of a central shaft 34 which extends through an opening provided in the lower base member 32b. The upper and lower base members 32a, 32b are separable from one another, with the shaft 34 being freely slidable through the opening in the lower base member 32b. The other end of the shaft 34 is connected to a jack 36 which is configured to translate the shaft 34 in an axial direction.

Figure 4A:
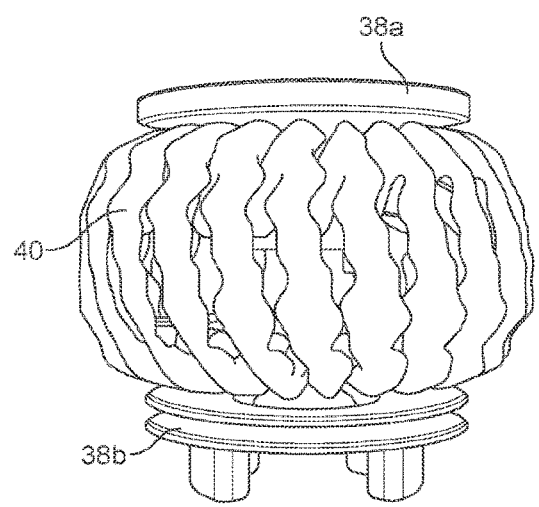
FIG. 4A is an enlarged view of the jack element and FIG. 4B is a cutaway view of the jack element.
Figure 4B:
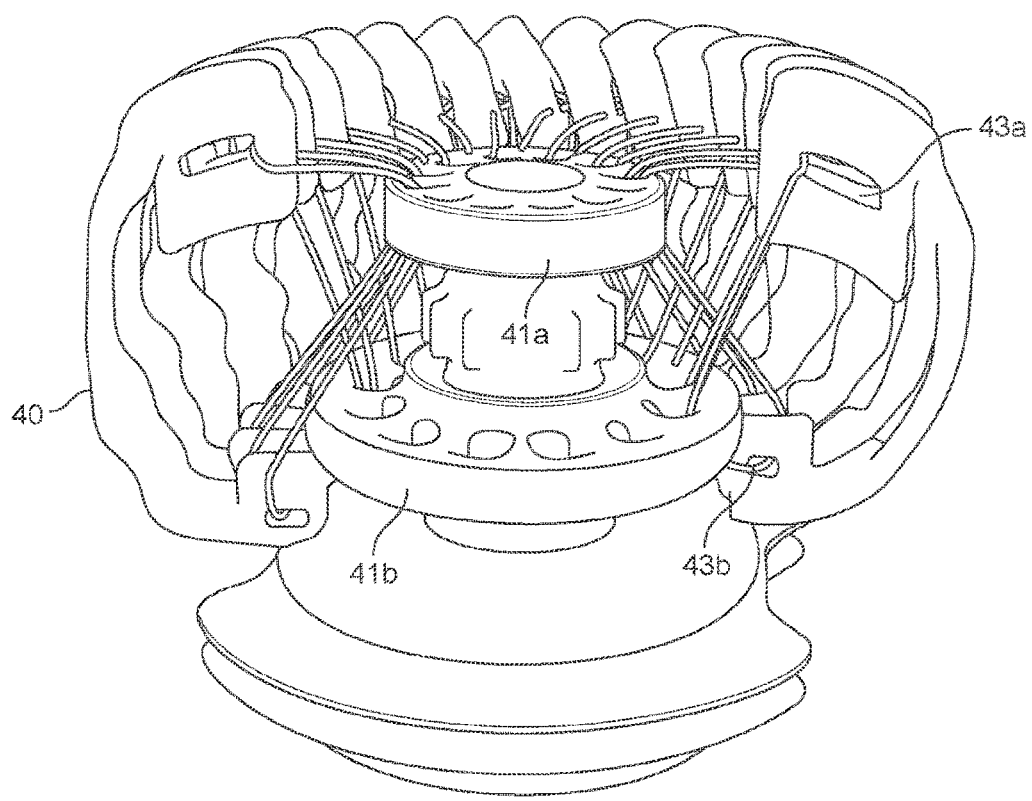

As shown in FIG. 4A, the jack 36 comprises upper and lower plates 38a, 38b between which are disposed a plurality of jacking members 40. The jacking members 40 are spaced around the circumference of the upper and lower plates 38a, 38b. As shown in FIG. 4B, the jacking members 40 are coupled to upper and lower discs 41a, 41b which are connected to the upper and lower plates 38a, 38b respectively for movement therewith. The jacking members 40 are coupled to the upper and lower discs 41a, 41b using a cable which loops through upper and lower holes 43a, 43b in the jacking members 40 and corresponding holes in the upper and lower discs 41a, 41b. The cable effectively allows the jacking members 40 to pivot relative to the discs 41a, 41b and relative to the upper and lower plates 38a, 38b.

The jack 36 has a raised configuration where the upper and lower base members 32a, 32b are spaced from one another, as shown in FIG. 3, and a lowered configuration where the upper and lower base members 32a, 32b are adjacent one another, as shown in FIG. 1. The jack 36 can be moved between the raised configuration and the lowered configuration (and vice versa) by rotating the upper and lower plates 38a, 38b relative to one another. In the raised configuration, each of the jacking members 40 is arranged axially. In other words, the ends of each jacking member 40 are aligned with one another in an axial direction. Conversely, in the lowered configuration, each of the jack members 40 is angled with respect to the axial direction such that their ends are offset from one another in the axial direction.

In use, a plurality of modules 2 may be arranged side by side to define an expansive interactive surface. The jack 36 of a module 2 allows the surface members 24 to be raised or lowered above or below the height of the remainder of the interactive surface. A store of replacement elements (not shown), particularly surface members 24, may be located below the interactive surface. Accordingly, by lowering the surface members 24 below the height of the remainder of the interactive surface, a replacing device (not shown) provided beneath the interactive surface can be used to replace the surface members 24 of the module 2 with replacement surface members 24.

The replacement surface members 24 may have a functional adaption which differs from that of the currently installed surface members 24. For example, different surface members 24 may be configured to provide or act as camouflage, insulation, conductivity, reflectors, diffractors and/or refractors, seals or other barriers, containers, transducers, etc. The surface members 24 can also have a variety of different chemical agents/substrate(s) bound thereto with alterable physical and chemical properties or states, to form probes, or chromatographic sorbent material, filters, barriers and impeders, binders, or spectrographic emission/absorbance surfaces/reflectors, channel routers, which can be selective and/or programmed, and alter or direct EMF radiation.

Figure 5:
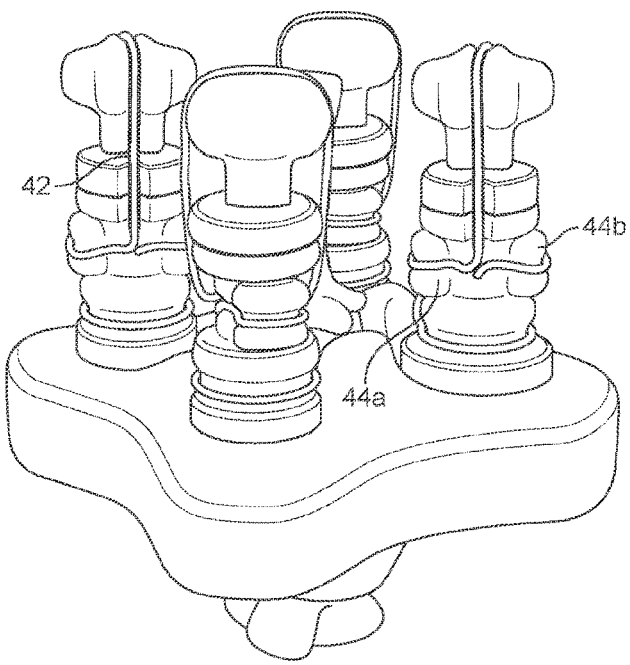
FIG. 5 is an enlarged view of the module showing a cable binding arrangement.

As shown in FIG. 5, the surface members 24 may be coupled to the intermediate mounting members 20 and to one another using a flexible, but resilient cable 42. It will be appreciated that the term "cable" is used broadly in this context and can include other tensile elements such as chains, ropes, etc. Preferably, the cable 42 comprises Dyneema® fibres.

The cable 42 encircles the outer sleeve 28 before passing through the wall of the outer sleeve 28 and downwards through the outer sleeve 28 and a hole in the underlying intermediate mounting member 20. The cable 42 loops around below the intermediate mounting member 20 before passing back through the hole in the intermediate mounting member 20 and through the surface member 24. The cable 42 then engages in a first circumferential locking ridge 44a on the outer sleeve 28 before passing over the top of the inner post 26 and back down the other side where it engages in a second circumferential locking ridge 44b which is diametrically opposed from the first circumferential locking ridge 44a.

The cable 42 is counter wound through the first and second circumferential locking ridges 44a, 44b so that it passes in a clockwise direction through one and in an anticlockwise direction through the other. This arrangement allows the cable 42 to rotate the inner post 26 relative to the outer sleeve 28, thereby raising or lowering the surface member 24.

The cable 42 may extend from the second circumferential locking ridge 44b of one surface member 24 to the second circumferential locking ridge 44b of an opposing surface member where the cable binding pattern is repeated. Alternatively, each surface member 24 may be coupled to its intermediate mounting member 20 using a discrete length of cable 42.

Figure 6:
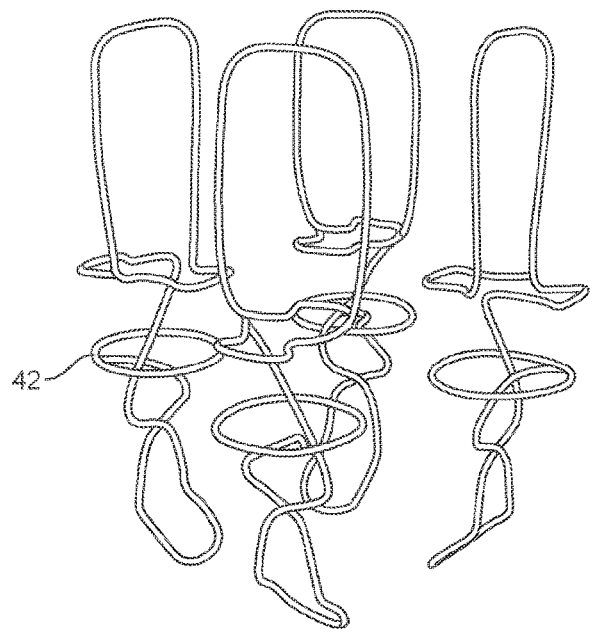
FIG. 6 is a perspective view of the cable binding arrangement with the elements of the module removed.

FIG. 6 shows the cable binding arrangement with the elements of the module 2 removed for clarity.

The lower loops of the cable 42 are connected to the mounting bracket 22 disposed between the intermediate mounting members 20 and the support member 10. As described previously, the mounting bracket 22 is rotatable relative to the intermediate mounting member 20 and the support member 10. Accordingly, movement of the lower loops of the cable 42 can cause rotation of the mounting bracket 22. The mounting bracket 22 may be biased to maintain tension in the cable 42.

The cable binding arrangement couples the support members 24 to the intermediate mounting members 20, while still allowing the support members 24 to move freely relative to the intermediate mounting members 20. Moreover, the cable 42 couples the support members 24 to one another.

The layers of the module 2 define an input and/or output pathway for the user interface, with movement of the elements of one layer causing movement of the elements in other layers.

Specifically, an input to the user interface is affected initially as a movement of the surface members 24 of the surface layer 8. This in turn causes movement of the intermediate mounting members 20 of the intermediate layer 6, which causes movement of the support member 10 of the base layer 4.

Conversely, an output from the user interface is affected initially as a movement of the support member 10 of the base layer 4. This in turn causes movement of the intermediate mounting members 20 of the intermediate layer 6, which causes movement of the surface members 24 of the surface layer 8.

Movement of the elements of the module 2 can be interpreted via changes in the cable 42. For example, a perpendicular force causes an axial depression of each surface member 24. This results in an even reduction of the cable loop over the support member 24. On the other hand, an oblique force causes an uneven reduction of the cable loop.

Figure 7:
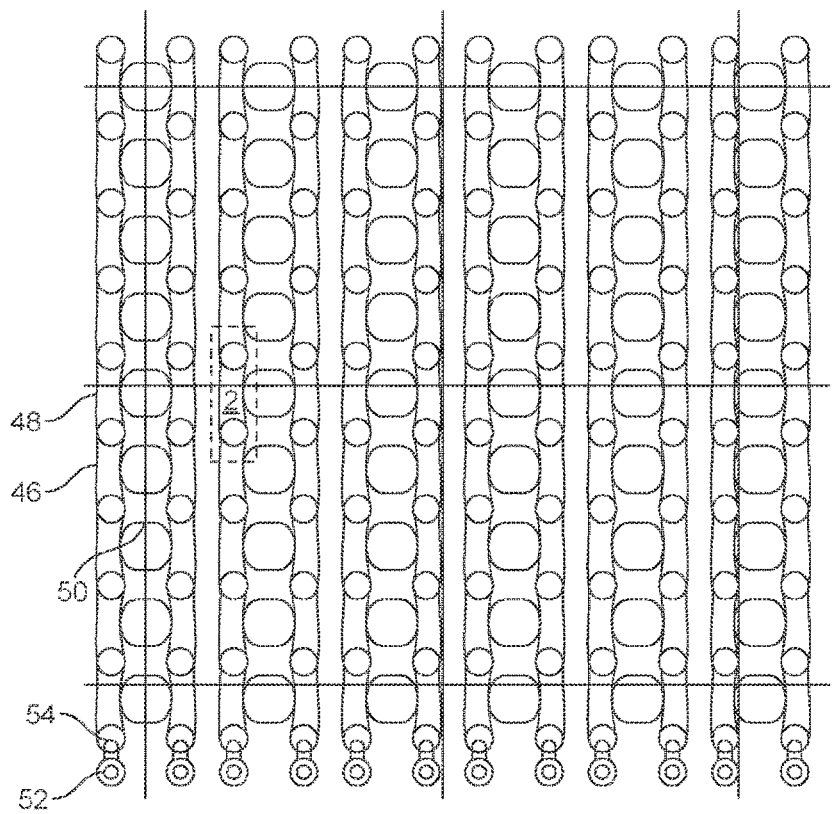
FIG. 7 is a plan view of a cable array.

As described previously, in use, a plurality of modules 2 may be arranged side by side to define an expansive interactive surface. FIG. 7 shows a cable array which is in communication with the modules 2 via the mounting brackets 22 of each module 2.

In FIG. 7, the modules 2 are disposed in a grid. A plurality of modules 2 are arranged side by side to form a column, and a plurality of columns are disposed side by side. The transverse axes of the modules 2 are aligned with one another and are oriented along the column.

As shown in FIG. 7, an internal cable loop 46 encircles the pair of mounting brackets 22 of the module 2, and an external cable loop 48 couples one of the mounting brackets 22 with a mounting bracket 22 of an adjacent module 2 in the column. All of the modules 2 in the column are therefore linked to one another by cable loops to form a chain of modules 2. In addition, adjacent columns are linked by column-linking loops 50 to form coupled pairs of columns. Each column-linking loop 50 connects the internal cable loops 46 of opposing modules 2 in adjacent columns.

An interpreting unit 52 is located at the end of each column. The interpreting units 52 are connected to the internal cable loop 46 of the end module 2 via a latch 54 which grips the internal cable loop 46.

The mounting brackets 22 are configured to oscillate the cable 42. The oscillation of the cable 42 effectively engages and releases the surface members 24. Any contact of the surface members 24 causes the oscillation of the cable 42 to be modified from the resting state and the modified oscillation can be perceived by the interpreting unit 52.

Figure 8:
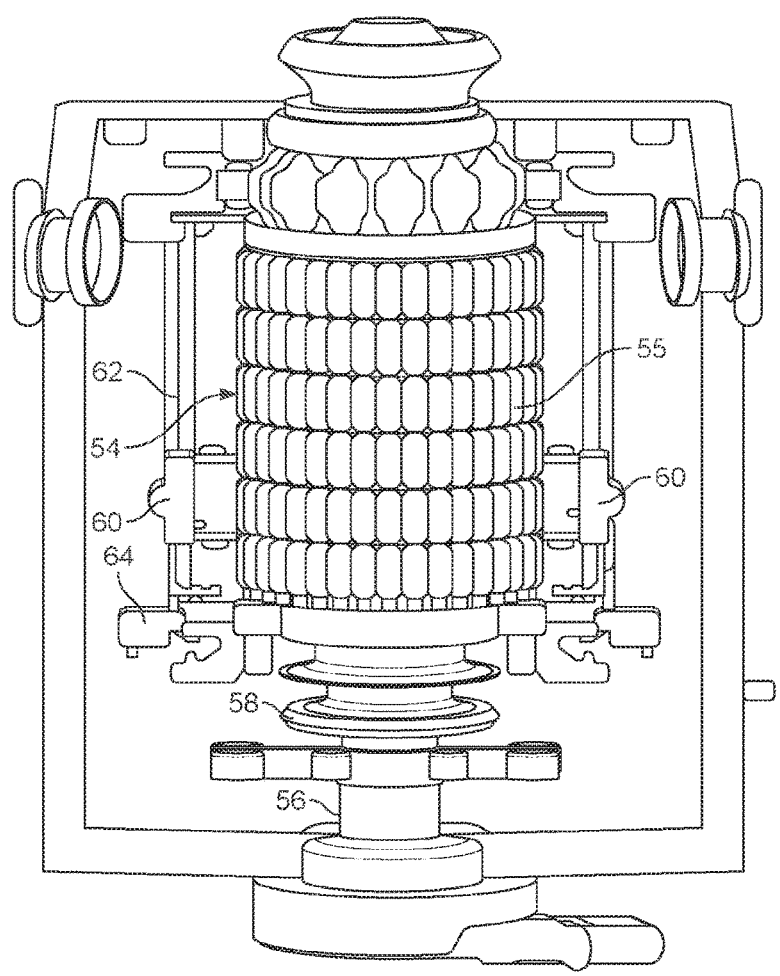
FIG. 8 is a perspective view of an interpreting unit used in the cable array of FIG. 7.

Referring now to FIG. 8, the interpreting unit 52 is formed primarily by a series interpreting rings 54 which are rotatably mounted on a common shaft 56. Each of the interpreting rings 54 is formed by a plurality of radially extending sub-units 55 which together define the outer surface of the interpreting ring 54. The sub-units 55 are movable in a radial direction such that the outer surface of the interpreting ring 54 can be modified. For example, the sub-units 55 can be configured so as to increase or decrease the diameter of the interpreting ring 54 or to adjust the local curvature of the interpreting ring 54.

A cable reel 58 is positioned on the shaft 56 below the interpreting rings 54. The latch 54 is received around the cable reel 58 and provides an input to the interpreting unit 52.

A reader arrangement is located externally to the interpreting rings 54. The reader arrangement comprises a pair of reader elements 60 which contact the interpreting rings 54 and are disposed on axial guides 62 which run parallel with the axis of the shaft 56. The axial guides 62 are arranged such that the reader elements 60 lie adjacent to the exterior surfaces of the interpreting rings 54. The axial guides 62 are provided with an elevator mechanism 64 which is configured to move the reader elements 60 along the axial guides 62 to traverse from one interpreting ring 54 to another.

The shaft 56 is configured to undergo an oscillation which corresponds to that of the cable 42 in the resting state. In turn, at rest, the interpreting rings 54 also undergo such an oscillation in response to the oscillation of the shaft 56.

A modified oscillation (as a result of contact with a module 2 in the column) received via the latch 54 causes the interpreting rings 54 to rotate relative to the shaft 56. The angular displacement of the interpreting rings 54 can be identified by the reader elements 60 to ascertain details regarding the modified oscillation and its source.

The interpreting unit 52 is able to identify which of the modules 2 in its column has been contacted, and to further specify the movement which has resulted in terms of the support members 24, the intermediate mounting members 20 and the support member 10.

As shown in FIG. 8, six interpreting rings 54 are provided which each have a different function and respond in different ways to the modified oscillation. For example, the six interpreting rings 54 may be responsible for identifying one of the following:

Which module 2 in the column has been displaced;
How much the support member 10 of that module has been displaced;
Which of the intermediate mounting members 20 has been affected;
How much that intermediate mounting member 20 has been displaced;
Which of the surface members 24 has been affected; and
How much that surface member 24 has been displaced.

Accordingly, the reader elements 60 traverse the axial guides 62 to identify the angular displacement of each interpreting ring 54 and to extract these details.

The interpreting unit 52 is thus able to identify and differentiate between complex contact gestures, such as swiping; pushing, poking and other depressions; bending; pinching, etc.

Each interpreting unit 52 outputs the angular displacement of each interpreting ring 54 as a nested output, together with a pre-sequence which is proportional to the distance of the interpreting unit 52 along the column array and thus uniquely identifies the interpreting unit 52.

The output of the interpreting units 52 (relayed as cable oscillations using composite displacement intervals) is received by an integrating unit (not shown). The integrating unit is responsible for combining the output of each interpreting unit 52 into a single nested output.

The mechanical, analogue output from the integrating unit is then passed to an analogue to digital converter (not shown). The analogue to digital converter is formed by an optical sensor having an emitter and a receiver, and an interrupter disposed between the emitter and the receiver. At rest, the interrupter lies between the emitter and the receiver and thus prevents light from passing from the emitter to the receiver. The signal received from the integrating unit causes the interrupter to oscillate. The range of oscillation is such that light is able to momentarily pass from the emitter to the receiver when the interrupter is at either extreme of the oscillation. The receiver therefore observes an on/off or digital signal which can be utilised in the interactive device. Of course, at rest the interrupter may not lie between the emitter and receiver, but may instead block light from the emitter as it oscillates.

The preceding description focuses primarily on the input pathway (i.e. where the interactive surface is used as an input to the interactive device). However, the interactive surface may also be used as an output for the interactive device. In this arrangement, the interactive device generates a digital signal to control the modules 2 of the interactive surface. The digital signal is converted into a mechanical, analogue output by a digital to analogue converter. The digital to analogue converter creates an oscillation from a digital signal and may be based on an electromagnet or other similar system.

The analogue output is passed to the integrating unit which divides the signal into individual components destined for each interpreting unit 52, with appropriate pre-sequences to allow each interpreting unit 52 to identify their respective components of the signal. Each interpreting unit 52 extracts its respective component and then combines the instructions for the individual modules 2 and elements within each module 2 to form a complex oscillation which is passed along the column of cable loops to each module 2. The modules 2 in the column receive the oscillation which causes the oscillation supplied by the mounting brackets 22 to be modified. In turn, the modified oscillation drives the elements of the module 2 to move from their resting position and to take up a new configuration.

Accordingly, the modules 2 are able to take on different topologies. On a larger scale, the number of modules 2 in the interactive surface can be adjusted to provide wholesale changes in the size (both in terms of surface area and volume) of the interactive surface. Moreover, the modules 2 can be controlled so as to provide different input characteristics. For example, the modules 2 can be adjusted to effectively provide different (virtual) surface textures. In other words, the response of the surface members 24 to the human touch can mimic the feeling of contact with a soft or hard surface, or a rough or smooth surface, for example. This can be used to provide haptic feedback for the interactive surface.

The interactive surface can be configured to correlate areas of the surface with specific functions. For example, the interactive surface can be configured to function as a keyboard with different areas representing different letters. The different areas may be defined visually, or the topology of the interactive surface can be adjusted to define keys. A revised topology can be used to implement many functions, such as switches, scroll bars, volume controls, etc.

The embodiment described previously is intended to receive inputs via human touch. However, this need not be directly via human touch and could be via a suitable input device, such as a stylus.

Figure 9:
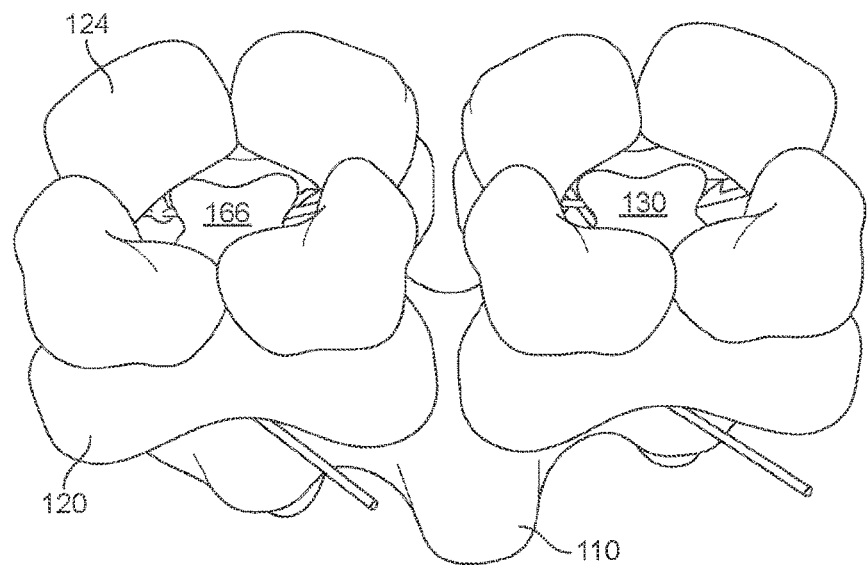
FIG. 9 is perspective view of a module of a user interface according to another embodiment of the invention.
Figure 10:
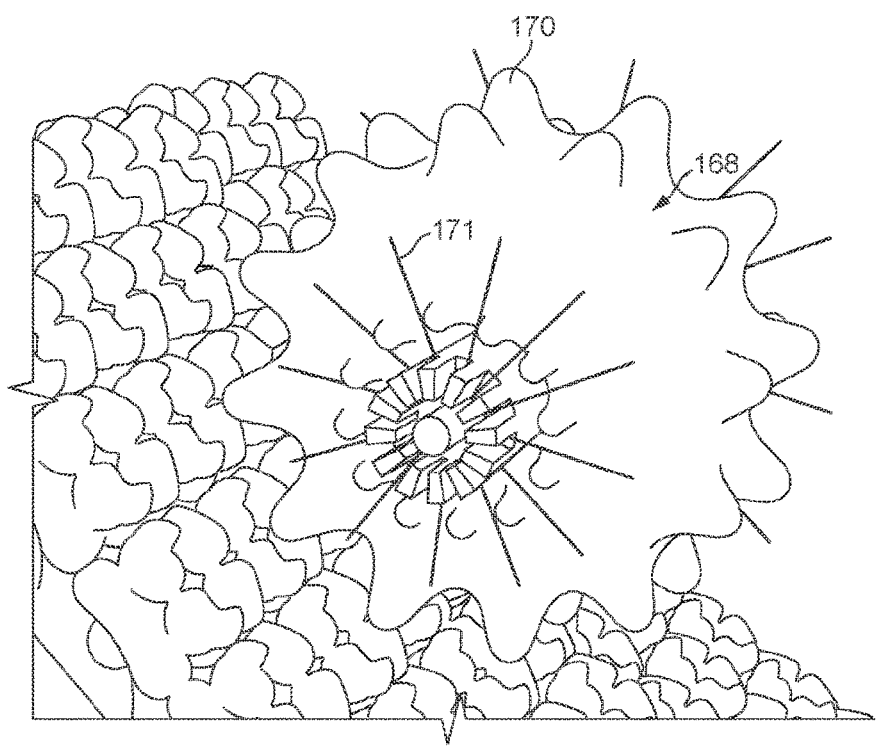
FIG. 10 is a perspective view of a user interface incorporating the module of FIG. 9.

The inventive concept may also be extended to interactive surfaces which receive inputs from other means. For example, FIGS. 9 and 10 show an alternative embodiment of a module 102 which can be used as a movement sensor and does not directly receive input via human touch.

In the following description of the module 102, those features which correspond to features described previously in relation to the module 2 will be denoted by the same reference numerals.

As in the module 2, the module 102 is formed by a plurality of layers which overlie one another. Specifically, the module 102 comprises a base layer 4, an intermediate layer 6 and a surface layer 108.

The base layer 4 and intermediate layer 6 correspond to those described previously in relation to the module 2 and comprise a single support member 10 forming the base layer 4 and a pair of intermediate mounting members 20 forming the intermediate layer 6. However, the surface layer 108 differs somewhat from the surface layer 8 of the module 2, as will be described below.

The surface layer 108 is again formed by a plurality of surface members 124 which are mounted on the underlying intermediate mounting members 20 of the intermediate layer 6, with a surface member 124 being mounted on each of the lobes of the intermediate mounting members 20 such that each intermediate mounting member 20 carries four surface members 124, with the surface layer 8 having a total of eight surface members 124 in all.

However, unlike the surface members 24 which are elongate posts, the surface members 124 are formed by chevron-shaped wings which are arranged such that their apexes are directed radially outwards. The four surface members 124 on each intermediate mounting member 20 are arranged so as to define an opening 166, with each surface member creating a quadrant of the opening 166.

As with the module 2, the surface members 124 are coupled to the intermediate mounting members 20 using a cable binding arrangement. The tension in the cable binding can be increased to draw the surface members 124 inwardly so as to reduce the size of the opening 166, or can be decreased to allow the surface members 124 to move outwardly.

As shown in FIG. 10, a plurality of modules 102 may be arranged side by side to define an expansive interactive surface. The interactive surface is not intended to be contacted directly by a user, but instead defines an enclosed shell (either alone or with non-interactive casing elements) which houses a movable ball 168 having an oblate (flattened) spheroid form. The enclosed shell may contain four discrete interactive surface beltways which are each disposed in a different plane in 3D space.

The ball 168 is provided with a plurality of projections 170 which project radially from the surface of the ball 168 and are spaced around the circumference of the ball 168 in a plurality of rows. In the present embodiment, three projections 170 are disposed in each row, however, this number can be increased or decreased according to desired sensitivity, or specific application requirements. In addition, the size and shape of each projection 170 can be altered from that shown to affect sensitivity.

The projections 170 are sized to be received within the openings 166. The spacing of the projections 170 about the ball 168 are configured to ensure that only one projection 170 is received within an opening 166 of a beltway at any one time (although several projections 170 may be received within openings 166 of different beltways).

A central body 130 may be provided at the centre of each opening 166, between the surface members 124. The central body 130 provides a depth stop which prevents the projections 170 from the entering too far into the openings 166. The size of the central body 130 can be configured to tailor the degree to which the projections 170 enter the openings 166. This may allow the speed at which the ball 168 traverses the interactive surface to be controlled.

Figure 11:
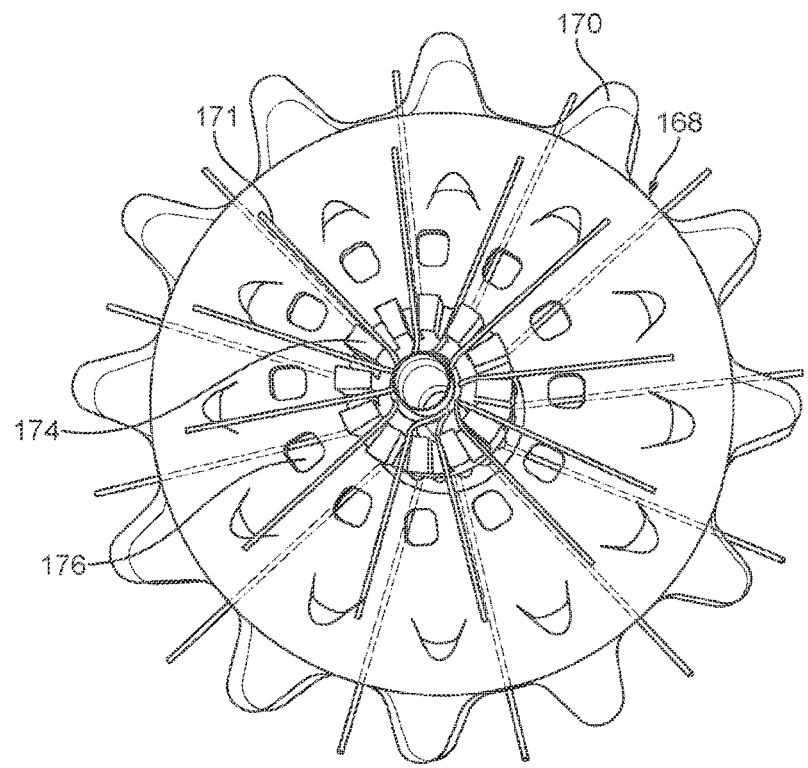
FIG. 11 is a side view of a movable ball of the user interface.
Figure 12:
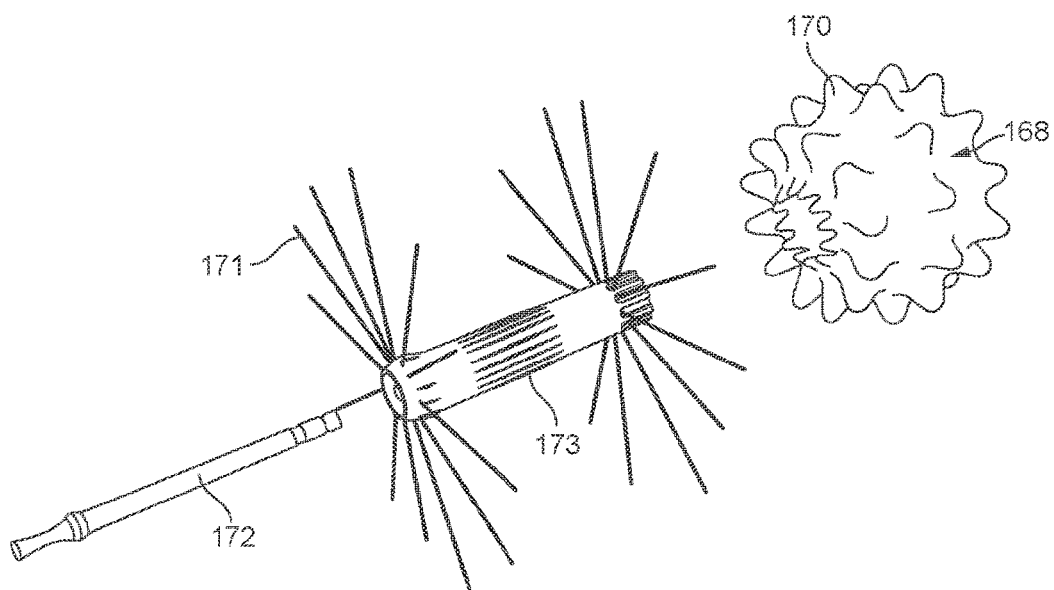
FIG. 12 is an exploded view of the ball assembly.

The ball 168 is coupled to a movement controller (not shown) by a series of cables 171. As shown in FIGS. 11 and 12, a central axle 172 and sleeve 173 extend through the ball from one side to the other. One side of the ball 168 is provided with a plurality of cable guides formed by trapezoidal posts 174. The posts 174 encircle the axle 172 and the sleeve 173, with the spaces between adjacent posts 174 defining the cable guides. The sleeve 173 is provided with corresponding cable guides which are formed by a series of axially extending slots in the sleeve 173 that are spaced around the circumference of the sleeve 173. The cables guides of the ball 168 and the sleeve 173 are aligned with one another. As shown in FIG. 11, each cable 171 passes radially inward between two adjacent posts 174, defining an inward cable guide, before extending circumferentially about the axle 172 and then radially outward between another two adjacent posts 174, defining an outward cable guide. A third cable guide is disposed between the inward cable guide and the outward cable guide, the third cable guide forming an inward or outward cable guide of another of the cables 171. Accordingly, the cables 171 are interlaced with one another and overlap radially around the axle 172.

Additional protuberances 176 may be provided radially outwardly from the posts 174. These protuberances 176 also act to guide the cables 171 and avoid the individual cables from becoming entangled with one another.

The cables 171 extend away from the ball 168 and pass over the top of the movement controller and back down to the contralateral side of the ball 168. Here the loops are attached to the sleeve 173. As shown in FIG. 12, the contralateral side of the ball 168 is also provided with cable guide formations. Movement of the device causes the movement controller to be perturbed in the relevant direction. This creates a differential tension in the cable loops around the ball 168 which causes the ball 168 to roll over the beltway by a distance which is proportional to the movement of the movement controller. The movement controller is therefore similar to the controller of a marionette puppet.

The movement of the ball 168 across the beltway causes the projections 170 to enter into the openings 166 defined by the surface members 124. This causes the surface members 124 to move which can be detected using the systems described previously in respect of the module 2, such as the interpreting unit 52.

Accordingly, the interactive surface provides accurate and precise movement sensing which can serve as an input to an interactive device.

Importantly, this includes tracking changes at very low or high speeds, as well as interpreting small or large changes in acceleration or deceleration over short time periods. The device is sensitive to very small displacements or angular changes in 3D space by virtue of the consistent and proportional physical interval or displacement changes that occur in the system, including being sensitive to repetitive compound actions within a short timeframe.

This data can in turn be transmitted or communicated to external wireless or physically wired devices, to match virtual or real world gestures, mechanisms or actions, as well as act as an equilibrist to maintain balance, or adjust righting responses, maintain a fixed orientation or direction of paired devices, including providing data to compensate, or adjust for, applied forces to external devices, bodies or vehicles within any environment.

The movement sensor described previously may be particularly advantageous as a controller in computer gaming or surgical applications for guiding a virtual or real element. The controller may comprise a further interactive surface on its outer surface which may receive inputs directly from a user. For example, the outer interactive surface may define buttons which can be depressed by the user.

Figure 13:
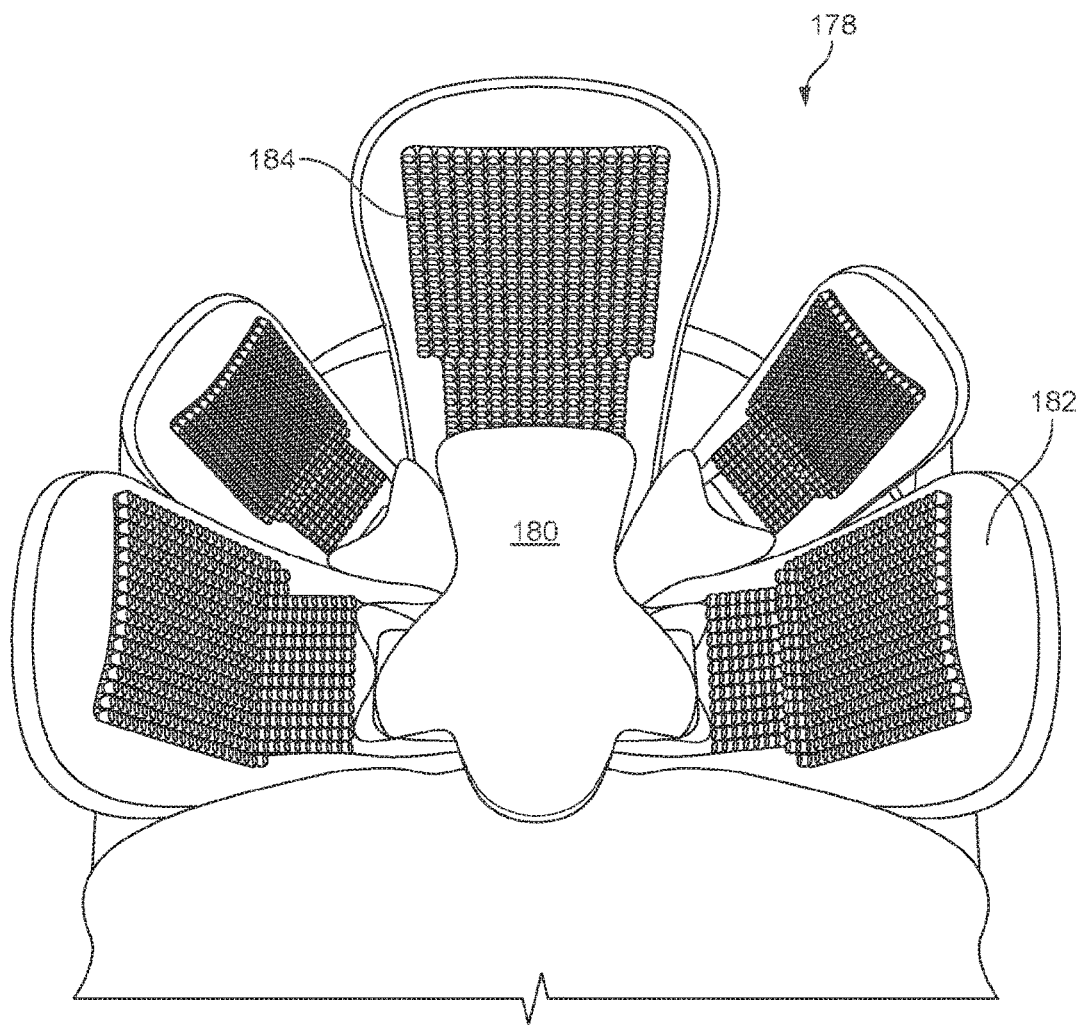
FIG. 13 is a top view of an embodiment of a controller implementing the user interface of the invention.

FIG. 13 shows an example of a controller 178 in which the user interfaces described previously may be implemented.

As shown, the controller 178 comprises a central thumb rest 180 and a plurality of inclined portions 182 which extend from the thumb rest 180. Each of the inclined portions 182 is provided with an interactive surface 184 formed by, for example, a plurality of the modules 2 described previously arranged in a matrix or grid. The interactive surface 184 extends over at least a portion of the inclined portion 178, but may also form the entire inwardly facing surface of the inclined portion 178.

The controller 178 is intended to be grasped by the hand of a user such that their thumb is received on the thumb rest 180 and their fingers are wrapped around a lower surface (not shown) of the controller 178 (as one may do with a conventional remote control used, for example, with a television). Each of the inclined portions 182 is in easy reach of the thumb rest 180 and can be contacted by the thumb of the user with minimal movement. Each of the inclined portions 182 (and possibly areas within each inclined portion 182) may be responsible for a different function or input. The thumb of the user can therefore quickly and efficiently traverse over the inclined portions 182 to effect the desired input.

The lower surface of the controller 178 may also be provided with an interactive surface. For example, the lower surface of the controller 178 may comprise a semi-circular or curved section around which the index finger of the user curls. Movement of the index finger over this surface may perform additional functions or provide additional inputs.

The controller 178 may also incorporate the movement sensor described previously so as to track the orientation and movement of the controller 178 in space.

Such an array of surface displaceable members and/or inner moveable members, by virtue of the herein described resultant generated oscillatory signals, use of integrated interpreting units and digital to analogue, analogue to digital converters may form the basis for, be interconnected or interacting with, integrated into, embedded within, or attached onto, a number of controlling or receiving interactive user interfaces, both electronic or analogue, in response to external communicated instructions, internal feedback trigger mechanisms, or from stored programs, with uses and applications by way of example, including but not limited to: creating customisable haptic surface controls composed of such displaceable or detachable surface members for the creation of instrument interfaces, for such uses as but not limited to, interactive gaming controls, note boards, camera controls, ticketing machines, laboratory interfaces, personal entertainment devices, intercoms, tills, computer assisted manufacturing equipment, ATM, dials, dashboards, or use of such interactive haptic surfaces for purposes of learning about an external environment, such as measurement of the physical properties of external surfaces, surface mapping, stabilised steering and/or navigation upon external surfaces, qualitative and quantitative surface grading, textural property detection, remote texture replication, physical replication of the texture of a surface, or of an object, plane, body form or device, creating surface materials such as textiles, fabrics, bedding, or furniture covers.

Such an array of surface displaceable members may be used in the physical rasterizing of device surfaces, as in using a haptic enabled surface to map the (external) surface texture for virtual replication or mimicry elsewhere, or to replicate or derive bump map patterns, or derive physical replication of such a surface(s), such as in creation of virtual textured files for use in 3D graphics, detection of rock grains, faults, surface defects, or crevices, in defining engineering structural or part defects, such as by way of example in ship hulls or tanks, or within machinery or complex engineering constructs, or uses such as in food item grading or manufacturing processes, grading of textiles, cable or rope, mineralogical grading, or postal mail sorting, marine bed agriculture, grading of flowers, or other horticultural products, such as sorting of hydroponic products.

Such surface arrays can be arranged to form part of real time flat, contoured or shaped interactive consoles or displays, employing the means to alter the position or disposition of individual or multiple surface members to form a continuous changing graphical display, information display or haptic relay surface, by way of example including but not limited to: digital notepads, tablets, touchscreen controls, home entertainment systems, home security systems, barriers, baby monitors, financial instruments and displays, automotive, embedded personal screen controls, dashboard and interactive feedbacks, such as programmable touch interfaces, as for example on steering wheel columns with tactile feedback for user differentiation or responses, human interface devices (HID), such as for telecommunication tablets, or kiosks, control module units, teller machines, dispensers, telecommunication devices, switch boxes, digital servers, deployment mechanisms or devices, guidance systems, relay transceivers, or Graphical User Interfaces (GUI), and non-graphical user interfaces, analogue, digital or other computer types or architectures, as well as being able to return back to predefined states, shapes or surface contours, textures, or deployed as functional sensors to measure physical indices, such as temperature, colour, pressure, weight, surface tension, friction, acceleration, velocity, magnetic fields, radiation levels, light intensity or other radiation, sound, noise, electrical fields, vibration, or respond to incoming received physical changes, or display contact gestures, convey haptic or textural properties, or information, respond to incoming programs, stored instructions, or internal feedback systems.

Such interactive haptic surfaces formed from displaceable members and/or inner moveable members can be integrated into, or be arranged to form interactive input machine consoles, handheld devices and/or instrument interfaces, with a fixed distribution or layout, or be programmed to swap layout or functions on demand, such as for control interfaces on gaming consoles, electronic devices, or by way of example on cameras, mobile phones and other communication devices, radio handsets, headsets, laboratory equipment, ATM machines, ticket dispensaries, interactive, information and advertising displays/signs/billboards, screen display controls, flight and automotive dashboard and flight cockpit controls, marine or shipping controls, or other complex applications, or in computer assisted manufacturing and design equipment, home environment controls, touchscreen embedded surface interfaces, smartphones, or other communication, display or control equipment, devices or systems, interfacing with computer or microprocessor based digital computers, whether mobile, desktop, wearable, smartphones, tablet, gaming and other programmable consoles, or embedded within digital or analogue appliances, machines, instrumentation, or educational interfaces, information nodes or interactive surface information transfer ports or loading equipment as by way of example, cranes or dollies or other loading devices.

Surface displaceable members may also be used to form interactive surfaces with a programmable format and having a coordinated arrangement, being thereby able to adopt tactile distinguishable and/or visually identifiable topological distributions, such as for displaying patterns, brand logos, camouflage, symbols, included within or on, by way of example, music player controls, or arranged to form surface facing symbols, characters or textural messages, or forming embossed or embedded motifs, Braille, machine readable codes or characters, as well as enhance non-visual user interaction, such as for volume controls, recessed switches, device or equipment controls, operation in low-visibility environments, as well as forming swappable patterns, such as by example on chits, coupons, slot machines, cards, caps, labels, tags, and tiles, for identification, branding and or counting processes.

Such herein described interactive surfaces may be used to derive haptic feedback details for purposes of surface replication onto other haptic enabled surfaces, such as but not limited to, on surgical instruments controls in producing a mirrored representation of the actual body tissue, body organ, or individual cellular surfaces lying in proximity to endoscopic, microsurgical, or other minimally invasive instrument interfaces, such an arrangement may be local to, or remote from, such as interaction, such as via 'tele-surgery' systems, such derived haptic feedback details may additionally be used for remote field surface detection, mapping or deriving sensory details of said surface(s) with secondary remote replication of such surface(s), or of more detailed compound structural form(s) of particular objects, in such activities as space exploration, where this may be used in planetary surface mapping, mapping of asteroid surfaces, or in planetary exploration, remotely communicated back to earth or remote station for secondary surface, body, object, or part thereof replication of the haptic surface in contact with such a haptic remote gathering device, such as arrangement may be used for the scaling of remote surfaces, such as on planet or asteroid ground surface(s), where such a surface is mirrored on a second remotely located haptic surface, such as back on earth, or a remote space station, or orbiting craft, to provide information regarding surface feedback properties, or to facilitate navigation, positional derived details, for instance to steer around remote obstacles.

Such interactive haptic surfaces may be size-scaled for purposes of mapping, where micro, nano or smaller haptic contact surfaces can interact and be used to map equivalent dimensioned and scaled objects, surfaces or devices, both organic or inorganic, and such surface(s) mirrored on, attached to, or upon remotely derived haptic surface(s), being scaled up or down into the miniature micro, nano or smaller dimensions, or macro-scaled enlargements for the purposes of deriving replicated or mimicked interactive surface(s), including but not limited to providing enhanced haptic information for secondary tasks, techniques or performances, using live or preprogrammed routines, or encoded analogue or digitally stored libraries, or live action sequences to provide tactile feedback information or details, with, by way of example, integrated pressure or other physical measurements, in order to enable improved primary, secondary or tertiary tactile surface interaction, for example in the remote manipulation of objects, or in remotely performed surgical techniques or procedures, or with mechanical, engineering or other remote assembly of parts, devices, machines, or apparatus, or performed in remote environments such as during underwater, space, land based, oceanic or aerospace exploration or habitation, or during surgical procedures, probing or operations, to provide haptic enabled instruments, tools, or equipment for such procedures, or to be used remotely in or with potentially hazardous environments, or for the integration of haptic interactive surfaces onto hazardous clothing or equipment, to provide external surface mapping, tactile or other physical feedback or interaction, as for instance by way of example to improve functionality of reinforced hazardous gloves or space suits, which currently give poor or zero tactile feedback details to the wearer, whereby such haptic interactive surfaces can be integrated onto the outside or positioned within clothing, thereby providing tactile feedback signals internally to the wearer or user, such systems may be embedded, or used as attached sensors, to provide such additional sensory information or feedback tactile or other physical details or data to the user upon contact of secondary surfaces.

Such an array of herein described surface displaceable interactive members with detachable surface members may be arranged to provide custom functions or tasks by interchanging or selection of suitable detachable exposed surface members, by virtue of their physical shape, form, material properties, or by inclusion of specialised generic or secondary sensory or actuator appropriately size-scaled devices, sensors or actuators, such detachable members or mounted devices may be swapped whilst during or in preparation of specific tasks, functions, or procedures to provide appropriate physical, biological characteristics or functionality, such as by way of example in loading a screw bit comprised of moveable and/or detachable members to drive a screw, or to provide the option to swap, remove or add additional tools, load custom components, change switches, connect batteries or other electronic or electrical components, replace damaged infrastructure using stored routines, or analogue or digital based algorithms, programs or instruction sets to remotely or automatically action such changes or activities, or via live action operator simulated control programs or via dual function procedures or sequences, whereby such detachable members may be customized for specific tasks, functions or purposes, which may be combined into a loader mechanism to provide multiple displaceable and/or detachable member reservoir for use in multiple tasks, whereby such members are rearranged, reorganised, interchanged or repositioned along the surface or across organised inner structural layers using displaceable members, to replicate or mimic specific tools, components or devices, including but not limited to providing remote maintenance systems, micro compartments, self-assembly rigs or devices, or in allowing for reconfiguration of whole or part thereof of such multi-member devices, for the purpose of creating new shapes, or forms by way of expansion or reduction in device volume, or by aggregation of such members upon the surface to provide organised function, shape, form or texture, or to mimic surface textures to form a particular specific organised structure as by example, a plug shape, such arranged haptic surface(s) may be coordinated to form preprogrammed, or user operated, assembly tasks with incorporated tactile feedback mechanism and for instance pressure control mechanisms, by using singular displaceable member units or arrays, or create specialised materials, surfaces or feedback controls, such as providing waterproof, or other sealed or physical barrier properties for gas, water, chemicals, hazardous environment controls, EMF resistant, radiation or fire resistant materials, as well as analogue controlled systems which are resistant to EMF radiation, are fire or heat retardant, shockwave resistance, contain surface dampening or chemical proof seals or other barriers and are not dependent upon digital, electrical, radio communications for supply or control, or to provide surface camouflage, insulation, altered conductivity, reflection, diffraction, or refraction properties, or any other physical properties as determined by the physical, structure, material characteristics of the exposed or inner layered moveable members.

Further uses and applications may arise from the herein described interface relationship between the moveable ball and plurality of beltways, coupled to a movement controller, whereby such a relationship changes position in response to movements in space, with or without external communicated instructions, or in combination with stored digital or analogue mechanical programs or algorithms, providing the means and basis for uses and applications in navigational, steering, topology mapping, or positional control equipment, systems or devices, whereby such an arrangement is integrated into, embedded within, attached onto, or interconnected with a number of controlling or receiving interactive user interfaces, both electronic or analogue, including but not limited to:

use of such a controller mechanism as herein described for purposes of navigation and/or steering in both 2D and 3D space, where such systems may be paired, providing the means for both virtual and real world examples of robots, flight or racing vehicles controls, in craft, such as by way of example, either manned or unmanned cars, planes, submarines, helicopters, submersibles, hovercraft, golf carts, fork lift trucks and/or other electrical, battery, compressed gas, or magnetic operated vehicles, drones, or other land, sea, aerospace remote controlled vehicles, remote control toys, remote demolition controllers, construction equipment, hoists, cranes, derricks, and other loading equipment, timing devices, virtualised simulators, projection devices, robots, tripods or artilleries, camera assembly and other optical, sound or radiation recording and/or transmitting devices, control lighting systems, paint spraying devices or apparatus, window cleaning gantries, scaffolding assemblies, automated or programmed manufacturing robots and assemblers, controlled component machines or apparatus, riveter, nailing or other assembly devices, ski lifts and equipment, and other such cable operating systems, air, ship, submarine or space flight control or avionics systems, aerospace equipment, agricultural devices and systems, transportation craft, equipment or vehicles and systems, or aerospace satellites, or for surface texturing to produce visual aids, sampling, or measurement of friction resistance for educational purposes or machine learning, for the purposes context selection of 2D/3D point, graphical, text, icon or cursor/pointer manipulation, tab simulation, menu selection, context navigation and/or positional control of keyboard or mouse, or other input devices, particularly when combined with a moveable ball interacting with a plurality of spatially arranged beltways as described herein, and other human, machine, or non-human information displays, whether used in combination or singularly in 2D or 3D projections or displays.

Such a herein described fine movement detection system may be used for purposes of combined navigation and motion detection, tilt detection and measurement, repetitive motion detection, motion tracking, treading or rolling, including common origin motion patterns, wide or confined displacement trajectories in 3D space, biometric profiling, within motion surveillance equipment, all of which can be used singularly or as part of a tactile feedback, or haptic surface array system or arrangement, providing the means for converting derived data from any attached systems, by way of example such as flight data, to provide the means to control, direct or drive vehicles, craft or equipment, as for by use of a joy stick control and avionics system, or to provide means for user operator mechanisms, or remote control devices, gaming controllers or robotic assemblies, or used in combination with displaceable member arrays to perform programmed actions, provide tactile feedback sensory cues, or combined with actuator mechanisms to provide reverb or other user active feedback contact surfaces, such as in computer gaming systems, or process simulators, such as by way of example but limited to, in providing in triggered or programmed actions or events within a computer game or program, such a fine movement detection system may be used as the basis, in combination with a suitable computation array, for calculations of range, range finding, or surface topology, or physical dimensions, or secondary derived physical calculations such as velocity, vectors, or other surface or 3D derived computations, including of topological surface distributions.

Such surface arrays with textural or haptic surface interactions may have a fixed distribution and layout, or be programmable, thereby being able to swap both layout and function, with such an arrangement by way of example be programmed to change format, or coordinated to adopt specific patterns, for instance brand logos, shapes, language displays, such as Braille characters, embossed and embedded motifs, textural displays and/or symbol or icon displays, or forming machine readable patterns, counters, tickets, coupons, billets, chips or within slot machines, cards, tokens, clothing support pads, or surface conforming stickers, material applications, or on ceramic or other suitable material tiles.

Further examples of uses and applications may be derived from the interaction between use of arrays of herein described surface interface displaceable members, with or without reconfigurable inner displaceable members, and/or use of the moveable ball mechanism with a plurality of herein described spatially arranged beltways, linked with a movement controller and resultant generated oscillatory signals, integrated interpreting units and digital to analogue, analogue to digital converters to provide combined functionality and communications means, having uses and applications by way of example, but not limited to:

surface interactive member arrays may be configured as input devices and combined with pressure sensors as detachable apical surface members to measure atmospheric motion, fluid turbulence and wave action, arranged as embedded or attached sensor arrays and connected to avionic control systems and fitted onto or into such surfaces by way of example as aircraft wings, vehicular airfoils, or submarine hydrofoils, such surface arrays may also be integrated into dedicated contact surfaces for small motion detection and interaction with computer input devices to provide context navigation of menus, text entry settings, virtual device controls, program interfaces, pin code entry password, entry of text messaging.

Such combinations can be integrated into joy sticks in game controls, equipment steering for use with gaming controllers, mobile phones, interactive displays, dispensers, domestic appliance and industrial appliance interfaces, laboratory equipment interfaces and scientific environmental learning systems, calculators, handheld devices and tester equipment, office equipment, gardening, agricultural and machine tool interfaces, as by way of example cutting equipment controls, hospital aids and assistive equipment control interfaces, bed controls, hoists, lifts, escalators, wheelchair controls, trolleys, trams, trains, cable-cars, metrological device interfaces and sensor mounting, recreational vehicle interfaces, sound equipment interfaces, remote shuttering interface controls, and internal environment control interfaces, manufacturing conveyor belts.

In a further aspect, in using the means as described herein to alter, rearrange or reconfigure all, or part thereof, of such multi-member arrays for the purpose of creating new physical forms or shapes, or rearrangement in space packing of displaceable members relative to each other, leading to expansion or reduction in volume, changes in surface contours, surface textures, or within specialised structures, or to provide different functional states, including reorganisation or rearrangement of displaceable members within the main structure or around the surface of the whole, in response to external communicated instructions, internal feedback trigger mechanisms, or from stored digital or analogue mechanical programs or algorithms, having uses and applications by way of example, but not limited to: 3D displays, advertising or media presentations displays, theatre props, information monitors, robotic assemblies, interfaces or structures with or without specialised integrated modules, 3D models, learning aids, educational interfaces, textural replication, graphical pairing, or graphical manipulations for 2D and 3D.

Deriving systems devices, instruments, tools or components which may be altered in shape form or functional characteristics to expand, or reduce tool shape or volume for different applications, rearranging of surface deformations, such as by way of example changing tool heads, mold cavities or castings, telescopic instrument or device mechanisms, mechanical jacks or supports, medical prostheses, self-assembly instruments, devices, components or apparatus, stowaway or foldable vehicles, devices, machines, craft or instruments, mining, exploration, excavation, or other confined working, exploration or recovery, safety or rescue/survival equipment, or preprogrammed constructions whether engineering, mechanical, artistic, commercial, industrial, domestic or digitally operated forming programmable or responsive devices, instruments, components, robots or apparatus able to respond to received instructions, commands or programs to change shape, form or size, or to respond to external environmental stimuli or triggers, or feedback systems, or embedded sensors, for instance to change shape in response to uneven surfaces to maintain balance on uneven surfaces, change in internal space packing ratios, where inner segments or layers inter-slide accommodate changes, or in the use of lock mechanisms comprised entirely of surface and inner displaceable members, printer and machine head surfaces, fluid distribution systems, or printer control interfaces, adjusting the center of mass to improve locomotion, balance, or stability.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

The invention is not limited to the embodiments described herein, and may be modified or adapted without departing from the scope of the present invention.

The invention claimed is:

1. A user interface for an interactive device, comprising:
an interactive surface formed by an array of displaceable surface members, the surface members being displaceable relative to one another;
an oscillatory signal generator configured to generate an oscillatory signal; and
characterized by:
a cable array coupled to the oscillatory signal generator, wherein the surface members are connected to the cable array such that the oscillatory signal is carried from the oscillatory signal generator to the surface members, and
wherein the surface members have a resting position with respect to the cable array and at least one of:
movement of the surface members from the resting position causes the cable array to move thereby adjusting the oscillatory signal to produce at least one of a modified oscillatory signal; and
a modified oscillatory signal, which causes the cable array to move thereby forcing the surface members to move from the resting position;
wherein the cable array is coupled to the oscillatory signal generator such that the oscillatory signal causes the cable array to oscillate,
wherein the user interface further includes a signal converter which converts the modified oscillatory signal i) to an electrical signal of the interactive device, or ii) from an electrical signal of the interactive device, or iii) both to and from an electrical signal of the interactive device.

2. The user interface as claimed in claim 1, wherein the surface members are mounted to a movable support member, the support member coupling the surface members to the cable array.

3. The user interface as claimed in claim 1, wherein the surface members are mounted to the support member via a pair of intermediate mounting members.

4. The user interface as claimed in claim 3, wherein the intermediate mounting members are disposed on either side of a pivot point of the support member.

5. The user interface as claimed in claim 3, wherein the support member forms a base layer, the intermediate mounting members form an intermediate layer and the surface members form a surface layer, wherein each element of an underlying layer supports twice as many elements of an overlying layer as are in the underlying layer.

6. The user interface as claimed in claim 3, wherein at least one of the support member, the intermediate mounting members and the surface members are configured so as to have at least two degrees of freedom and are biased towards the resting position.

7. The user interface as claimed in claim 3, wherein the surface members are secured to at least one of the support member and the intermediate mounting members using resilient cable binding, biasing the surface members towards the resting position.

8. The user interface as claimed in claim 3, wherein the surface members are detachably mounted to at least one of the support member and the intermediate member.

9. The user interface as claimed in claim 1, wherein the surface members are formed by posts which project from a proximal end nearest the cable array to a distal end, the distal ends of the surface members being adjacent to one another and defining the interactive surface.

10. The user interface as claimed in claim 9, wherein the posts are formed by an outer sleeve and an inner element which is received within the outer sleeve to form a telescoping arrangement.

11. The user interface as claimed in claim 10, wherein the outer sleeve and inner element are biased towards an extended position.

12. The user interface as claimed in claim 10, wherein the outer sleeve and inner element are threadingly engaged with one another such that rotation of the outer sleeve relative to the inner element causes the outer sleeve to translate axially relative to the inner element.

13. The user interface as claimed in claim 1, wherein the surface members are formed by chevron-shaped wings which each define a quadrant of an opening, the interactive surface comprising a plurality of openings.

14. The user interface as claimed in claim 13, further comprising a movable ball which is configured to traverse across the interactive surface in response to movement of the user interface, the ball having a plurality of projections which are received by the openings and which cause the surface members to move from the resting position so as to produce the modified oscillatory signal.

15. The user interface as claimed in claim 14, wherein the interactive surface is formed by a plurality of beltways which are disposed in different planes to enclose the ball, each of the beltways having a plurality of openings.

16. The user interface as claimed in claim 14, wherein the projections are arranged such that, at any one time, only one opening of each beltway receives a projection of the ball.

17. The user interface as claimed in claim 14, wherein the ball is coupled to a movement controller via a plurality of cables, wherein, in response to movement of the user interface, the movement controller moves relative to the user interface and in turn causes the ball to traverse across the interactive surface.

18. The user interface as claimed in claim 1, wherein the interactive surface is formed by a plurality of independent but functionally coupled modules, each module comprising a plurality of surface members.

19. The user interface as claimed in claim 18, wherein the interactive surface is configured to be adapted by at least one of replacing modules and introducing additional modules or removing modules to change the size of the interactive surface.

20. The user interface as claimed in claim 18, wherein the modules are coupled to one another by complementary abutting features, interconnections or via an interconnecting cable network.

21. The user interface as claimed in claim 18, wherein each module is supported by a central shaft.

22. The user interface as claimed in claim 21, wherein the central shaft is connected to the module at one end and a jack at an opposite end, the jack being configured to raise and lower the module relative to adjacent modules.

23. The user interface as claimed in claim 22, wherein the jack is formed by first and second plates which are connected by a plurality of jacking members, the jacking members being spaced around the circumference of the first and second plates; wherein the jack has a raised configuration in which each of the jacking members is arranged axially such that their ends are aligned with one another in an axial direction, and a lowered configuration in which each of the jack members is angled with respect to the axial direction such that their ends are offset from one another in the axial direction; wherein the jack is movable between the raised and lowered configurations by rotating the first and second plates relative to one another.

24. The user interface as claimed in claim 22, wherein the jack is configured to lower the surface members of the module to below the level of adjacent modules, wherein replacement surface members are held beneath the interactive surface, and wherein a replacing device is provided beneath the interactive surface to replace the surface members of the module with the replacement surface members.

25. The user interface as claimed in claim 24, wherein the surface members and replacement surface members have different physical properties.

26. The user interface as claimed in claim 22, wherein the jack is configured to raise the module above the level of adjacent modules to allow the module to be replaced with another module before being lowered to its original position.

27. The user interface as claimed in claim 19, wherein the modules are arranged in a grid formed by a plurality of columns of modules, with the cable array coupling the modules in each column to one another.

28. The user interface as claimed in claim 27, wherein the cable array further couples adjacent pairs of columns to one another.

29. The user interface as claimed in claim 27, further comprising an interpreting unit coupled to the cable array at the end of each column, wherein the interpreting unit is configured to receive and interpret the modified oscillatory signal for at least one of deriving information regarding the movement of the individual modules and generating a modified oscillatory signal which causes the individual modules to move from their resting positions.

30. The user interface as claimed in claim 29, further comprising an integrating unit which is in communication with a plurality of interpreting units, the integrating unit being configured to combine signals from the interpreting units into a single signal and/or decompose a signal into parts for each interpreting unit.

31. The user interface as claimed in claim 30, wherein the signal converter comprises at least one of an analogue to digital and a digital to analogue converter which is configured to convert an analogue signal from the integrating unit into a digital signal to be used by the interactive device and/or to convert a digital signal from the interactive device into an analogue signal to be used by the integrating unit.

32. The user interface as claimed in claim 31, wherein the analogue to digital converter comprises an optical sensor having an emitter and a receiver, and an interrupter disposed between the emitter and the receiver; wherein the interpreter is configured to oscillate across a path between the emitter and receiver in response to an analogue signal such that the receiver observes a digital signal.

33. The device comprising a user interface as claimed in claim 1.

34. The user interface as claimed in claim 3, wherein the intermediate member is detachable mounted to the support member.

* * * * *